Patented Nov. 21, 1922.

1,436,362

UNITED STATES PATENT OFFICE.

WILLIAM R. SEIGLE, OF NEW YORK, N. Y.

METHOD OF MODIFYING OILS AND THE PRODUCT THEREOF.

No Drawing. Application filed June 28, 1920. Serial No. 392,375.

*To all whom it may concern:*

Be it known that I, WILLIAM R. SEIGLE, a citizen of the United States of America, and resident of New York, in the county of New York and State of New York, have invented new and useful Improvements in Methods of Modifying Oils and the Product Thereof, of which the following is a specification.

My invention consists of a method of modifying oils which are susceptible of polymerization and of preparing various compositions of oils, modified by the method, with bituminous, asphaltic, or resinous materials capable of solution in the oils, and of the products and compositions of matter which result from the employment of the method. The object of my invention is to produce a substance of oily character, thickened or hardened, which shall possess permanent constitution, be incapable of change by oxidation at ordinarily encountered temperatures, effective as a binder or impregnant of fibrous structures such as leather, paper, mill board, felt, textiles, or porous blocks or bodies, and which shall when compounded suitably to the purpose, impart to such impregnated materials frictional or adhesive qualities, and which shall lend itself also to modification by addition of bituminous, asphaltic or resinous substances which specially qualify the physical characteristics of the composition for special purposes, as by lending it adhesiveness, or modifying the frictional coefficient and surface character of the body which is impregnated or coated with the composition.

Principally, therefore, my invention consists in the oily base-material or composition and the method of making it; this composition may be used without further modification for various purposes, such as the impregnation of porous or bibulous bodies. Secondarily, and in its specific refinements, my invention is characterized by the modification of the oily base by incorporation therewith of other substances which are to a substantial extent solubly miscible with the oily material of which the base is made. A particular object which I have in view, which will serve as a special illustration of the utilities which my new composition of matter is adapted to serve, is the impregnation of friction-materials, such as brake-blocks and linings, the bodies of which are composed of textile or felted materials, usually of asbestos fibre in whole or in large part. For many years it has been the practice to impregnate blocks, linings, or bands of asbestos material with cementitious materials such as rubber, or with a drying oil, usually linseed oil. and to harden and thicken this impregnant by oxidation or heat or both. The purpose and effect of such impregnation has been, and is, to introduce a binding or solidifying material by incorporation with the fibres, and to produce a friction surface suitable to the functions of a brake or clutch. Oxidation of a drying oil in these situations is made to penetrate as deeply as possible into the body of the friction-material, but since oxidation forms a varnish-like film, the modified character of the surface portions of the impregnant always operates to protect interior parts, and opposes the progress of oxidation thereto. As a brake block, or the like, thus impregnated, wears away in use, partially oxidized regions in the impregnant are exposed, and become chemically saturated with oxygen by contact with air and under the heat generated by friction. Nevertheless this piecemeal modification of the impregnant is by no means conducive to uniformity in friction-coefficient, and if it be retarded or prevented the binding effect of the impregnant on the fibres with which it is incorporated is inferior, and the frictional body becomes rapidly abraded and destroyed.

The oily material which I have invented has this advantage; that its constitution is made permanent, there is substantially no further capacity inherent in it for molecular saturation by oxygen or other reagent; therefore the body or material impregnated with it is of uniform physical consistency throughout, and permanent in constitution, and the surface of the body possesses the same frictional characteristics at all stages of reduction by wear. As a binder of fibres, moreover, this oily composition is highly effective, and when incorporated in a fibrous body renders it resistant to abrasion to a pronounced degree.

The drying oils have a molecular structure which is initially unsaturated, the phenomenon known as drying is the saturation of the molecules by union of free bonds with oxygen. As is well known, saturation of oils may be accomplished by union of the free bonds with hydrogen in the presence of a catalyst, notably nickel. Some oils, for example, chinawood oil (tung oil) and castor oil, are capable of self-saturation or polymerization when raised to a critical temperature. All these modes of molecular saturation are accompanied by a physical thickening or hardening of the oil.

The final state of the oily base-material is complete, or substantially complete, molecular saturation; a condition which may be ascertained by the iodine test.

For example, china-wood oil, or tung oil is a drying oil, susceptible of polymerization under heat. The temperature of self-saturation or polymerization of its molecules is, however so close to that at which the oil molecule is destroyed, that this oil can be thus rendered permanent in constitution, and no longer susceptible of molecular saturation by oxidation, only by the exercise of great care in the regulation of temperature and the distribution of heat to all parts of the oil. The physical change which marks its polymerization is a thickening or hardening of the oil.

The requisite temperature for this transformation without undersirable consumption of time is not far from 300° C., and if the oil, is not to suffer molecular disintegration, the application of heat should be gradual, and carefully guarded against rise of temperature to the danger-point. Therefore, a more practical method of producing molecular saturation in the oil which I have invented will be as follows:

Subject tung oil to catalytic hydrogenation until its iodine number has fallen to between 120 and 130. At this degree of partial hydrogen-saturation, the oil will remain sufficiently fluid at a temperature from 120° to 130° C., to saturate readily a porous or interstitial body, such as a felted asbestos fibre block or mill board, and if the object be the impregnation of such a body, heat the partially hydrogenated tung oil to from 120° to 130° C., and impregnate the porous or bibulous body with it.

The oil, thus partially molecularly saturated by hydrogenation, will complete its molecular saturation, or satisfaction required for equally rapid free-bonds, by polymerization, at a temperature of 240° C., which is substantially lower than the temperature of polymerization of the oil in its original state, and does not endanger the molecular integrity of the oil. In mass, the oil-product is an elastic jelly-like substance, slightly sticky or adhesive.

But, while the oil-product above described may be used for various purposes without further modification, it is preferable to give the oil special treatment in order to adapt the final product more perfectly to special purposes.

If, for instance, the oil-composition is to be used as an impregnant for brake shoes or linings, I add to the partially hydrogenated tung-oil—above described—a hard asphalt, such as gilsonite or grahamite, in proportions which are subject to variation with portions which will go into solution in the oil. An excess of this maximum may do no harm, but on the other hand is not believed to be of any benefit or advantage. If gilsonite be employed, the proportions may vary from one to ten per cent on the weight of the oil. The maximum soluble in the oil at 130° C. is about twenty per cent.

Then heat the partially hydrogenated oil with its content of gilsonite to about 130° C., impregnate the porous body, such as a felted asbestos sheet, with the oil composition, and then heat the oil composition in situ to about 240° C., maintaining this temperature for several minutes, or for a time long enough to effect substantially complete molecular self-saturation, as determined by the iodine test.

When the oil-gilsonite composition is heated and polymerized by itself, it thickens to a rubbery mass, which is elastic and not so tacky or sticky as the polymerized oil alone. The gilsonite modifies the physical constitution of the oil-product so that a brake lining impregnated with it offers a frictional surface which is harder and more resistant to wear than a lining impregnated with the polymerized oil product or base-material, alone. The uniformity and permanency of constitution of this impregnant ensures uniformity in the friction surface and its coefficient, as the brake lining body wears away.

If the impregnated body be heated in contact with air, the oil-composition will become molecularly saturated by oxidation at the surface, either in whole or in part, and a film of oxidized oil will be formed. This at once serves to enclose the inner portions of the oil-composition and protect them from the action of oxygen; the assumption by the oil composition of the critical temperature for polymerization presently brings about the final and permanent saturation-change.

The base-material is adapted to modification by other asphaltic, pitchy, bituminous, or resinous materials, provided these are solubly miscible in the oil from which the base material is developed; and according to the modifying material selected, the final composition will present specific and peculiar characteristics. For example, if it be desired to compound a belt dressing or strongly adhesive frictioning material, the composition should be stickier than that above described, which is adapted to produce a regulated sliding friction with a brake member, and such a stickier composition will result by adding about five per cent by weight on the partially hydrogenated oil, of coal tar pitch, which dissolves in the oil. After completing the molecular saturation of the oil thus modified by polymerization at 240° C. or thereabouts, the product will be a sticky or gummy jelly, which, when spread or rubbed into a driving belt, will greatly increase the adhesion of the belt to a pulley.

The above described base material may be specially adapted to a miscellany of uses by the empirical selection of hydrocarbons which, like sundry asphalts, bitumens, pitches, resins or gums, are solubly miscible in some proportion in the oil which is to be thickened by molecular saturation. These modifying substances, according to their quality, vary the adhesiveness of the finally resulting compound.

The special adaptation of the oil hardening process above described to the impregnation of porous or bibulous materials, the molecular saturation of an oil, (whether or not preliminarily partially saturated) by heat polymerization in situ after the oil has been absorbed into such materials, and the modes of making friction materials such as brake or clutch linings, with the specific products thereof, by means of the above described process, are made the subject of description and claim in application for Letters Patent of the United States filed by me concurrently herewith, and serially numbered 392,376.

I claim:

1. The method of molecularly saturating a heat-polymerizable oil to substantial permanency of constitution which consists in partially saturating the free bonds of such an oil by union with an introduced reagent, and thereafter substantially completing the molecular saturation of the oil by polymerization under heat.

2. The method of molecularly saturating a heat-polymerizable oil to substantial permanency of constitution, which consists in partially hydrogenating such an oil, thereby lowering the heat polymerization temperature, and thereafter substantially completing the molecular saturation of the oil by polymerization under heat.

3. The method of molecularly saturating tung oil to substantial permanency of constitution, which consists in partially saturating the free bonds of the oil by union with an introduced reagent, thereby lowering the heat-polymerization temperature, completing the molecular saturation of the oil by polymerization under heat.

4. The method of molecularly saturating tung oil to substantial permanency of constitution, which consists in partially hydrogenating the oil, thereby lowering its heat-polymerization temperature, and thereafter substantially completing the molecular saturation of the oil by polymerization under heat.

5. The method of molecularly saturating tung oil to substantial permanency of constitution, which consists in hydrogenating the oil to an iodine number from 120 to 130, thereby lowering its heat-polymerization temperature, and thereafter substantially completing the molecular saturation of the oil by polymerization at substantially 240° centigrade.

6. The method of producing an oily composition of substantially permanent constitution, which consists in partially saturating the free bonds of a heat-polymerizable oil by union with an introduced reagent, adding to said oil a solid hydrocarbon solubly miscible therein, and thereafter substantially completing the molecular saturation of the oil by polymerization under heat.

7. The method of producing an oily composition of substantially permanent constitution, which consists in partially hydrogenating a heat-polymerizable oil, adding to said oil a solid hydrocarbon solubly miscible therein, and thereafter substantially completing the molecular saturation of the oil by polymerization under heat.

8. The method of producing an oily composition of substantially permanent constitution, which consists in partially hydrogenating tung oil, adding to said oil a solid hydrocarbon solubly miscible therein, and thereafter substantially completing the molecular saturation of the oil by polymerization under heat.

9. The method of producing an oily composition of substantially permanent constitution, which consists in partially hydrogenating tung oil, adding to said oil an asphaltic material solubly miscible therein, and thereafter substantially completing the molecular saturation of the oil by polymerization under heat.

10. The method of producing an oily composition of substantially permanent constitution, which consists in partially hydrogenating tung oil, dissolving gilsonite in said oil, and thereafter substantially completing the molecular saturation of the oil by polymerization under heat.

11. The composition of matter, comprising an oil, molecularly saturated in part by union with hydrogen, and in the remainder by polymerization.

12. The composition of matter comprising an oil, molecularly saturated in part by union with an introduced reagent, in the remainder by polymerization, and containing a solid hydrocarbon solubly miscible in the oil.

13. The composition of matter, comprising tung oil, in part hydrogenated, in the remainder polymerized.

14. The composition of matter, comprising tung oil, in part hydrogenated, in the remainder polymerized, and containing a solid hydrocarbon solubly miscible in said oil.

15. The composition of matter, comprising tung oil, in part hydrogenated, in the remainder polymerized, and containing a hard asphalt solubly miscible in said oil.

16. The composition of matter, comprising tung oil in part hydrogenated, in the remainder polymerized, containing gilsonite.

Signed by me at New York, N. Y. this 25th day of June 1920.

WILLIAM R. SEIGLE.